US012782092B2

(12) United States Patent
Strihagen et al.

(10) Patent No.: US 12,782,092 B2
(45) Date of Patent: Nov. 3, 2026

(54) METHOD AND SYSTEM FOR DISPENSING DETECTION OF A PYROTECHNICAL COUNTERMEASURE

(71) Applicant: SAAB AB, Linköping (SE)

(72) Inventors: Karl Strihagen, Vällingby (SE); Albert Swanepoel, Hässelby (SE)

(73) Assignee: SAAB AB, Linköping (SE)

( * ) Notice: Subject to any disclaimer, the term of this patent is extended or adjusted under 35 U.S.C. 154(b) by 494 days.

(21) Appl. No.: 18/263,437

(22) PCT Filed: Feb. 11, 2022

(86) PCT No.: PCT/SE2022/050146
§ 371 (c)(1),
(2) Date: Jul. 28, 2023

(87) PCT Pub. No.: WO2022/177492
PCT Pub. Date: Aug. 25, 2022

(65) Prior Publication Data

US 2024/0308660 A1 Sep. 19, 2024

(30) Foreign Application Priority Data

Feb. 16, 2021 (SE) .................................... 2100024-5

(51) Int. Cl.

| | |
|---|---|
| ***F41H 11/02*** | (2006.01) |
| ***B64D 1/02*** | (2006.01) |
| ***F42B 12/70*** | (2006.01) |

(52) U.S. Cl.
CPC ................ *F41H 11/02* (2013.01); *B64D 1/02* (2013.01); *F42B 12/70* (2013.01)

(58) Field of Classification Search
CPC ............. F41H 11/02; B64D 1/02; B64D 7/00; F42B 12/70; F42B 12/36; F42B 39/26;
(Continued)

(56) References Cited

U.S. PATENT DOCUMENTS

| | | | | |
|---|---|---|---|---|
| 4,301,709 | A | 11/1981 | Bohorquez et al. | |
| 4,313,379 | A | 2/1982 | Wallace | |
| 2006/0086277 | A1 | 4/2006 | Bossarte et al. | |
| 2014/0138474 | A1 | 5/2014 | Sharpin et al. | |
| 2015/0331417 | A1 * | 11/2015 | Theiss .................... | H04B 17/10 702/122 |

(Continued)

FOREIGN PATENT DOCUMENTS

| | | | |
|---|---|---|---|
| CN | 101118140 | B | 4/2010 |
| DE | 102018213179 | A1 | 2/2020 |

(Continued)

OTHER PUBLICATIONS

KR-20150145625-A_translated (Year: 2015).*
Extended European Search Report for Application No. 22756639.5, dated Dec. 6, 2024, 5 pages.

(Continued)

*Primary Examiner* — Catherine T. Rastovski
*Assistant Examiner* — Michael J Singletary
(74) *Attorney, Agent, or Firm* — ALSTON & BIRD LLP

(57) ABSTRACT

The disclosure relates to a system and a method for dispensing detection of a pyrotechnical countermeasure in a pyrotechnical countermeasure dispenser system (1). The method comprises: —providing a pyrotechnical countermeasure dispenser control unit (4) with a recoil-sensing device (5), wherein upon activation of a pyrotechnical countermeasure dispensing command, —monitoring the sensing of a recoil signal (8) from the recoil-sensing device (5) during a monitoring window (6), —determining that a dispensing of the pyrotechnical countermeasure from a pyrotechnical countermeasure cartridge (3) has occurred upon detection of the recoil signal (8) exceeding a recoil detection threshold value (9) during the monitoring window (6), —determining that a misfire of the pyrotechnical countermeasure has occurred upon no detection of the recoil signal (8) during the monitoring window (6).

14 Claims, 3 Drawing Sheets

(58) Field of Classification Search
CPC ........ F42B 5/15; G01P 15/0891; G01P 15/00; G05B 2219/37434; G05B 2219/37435; G05B 2219/45071; G05B 23/0235; G05B 23/00; F41F 7/00; H04B 17/00
See application file for complete search history.

(56) References Cited

U.S. PATENT DOCUMENTS

| | | | | |
|---|---|---|---|---|
| 2019/0063882 | A1* | 2/2019 | Brockel | F41J 7/06 |
| 2021/0331788 | A1* | 10/2021 | Moravek | B64F 5/60 |

FOREIGN PATENT DOCUMENTS

| | | | | | |
|---|---|---|---|---|---|
| GB | 2470626 | A | | 12/2010 | |
| GB | 2472077 | A | | 1/2011 | |
| KR | 10-2015-0145625 | A | | 12/2015 | |
| KR | 20150145625 | A | * | 12/2015 | F41F 1/06 |
| RU | 2495366 | C1 | | 10/2013 | |
| WO | WO 2020/183454 | A1 | | 9/2020 | |
| WO | WO 2020/246931 | A1 | | 12/2020 | |

OTHER PUBLICATIONS

International Searching Authority, International Search Report and Written Opinion received for International Application No. PCT/SE2022/050146, dated Apr. 19, 2022, 19 pages, Swedish Patent and Registration Office, Sweden.

Swedish Patent and Registration Office, Search Report received for Application No. 210024-5, dated Sep. 20, 2021, 3 pages, Sweden.

* cited by examiner

METHOD AND SYSTEM FOR DISPENSING DETECTION OF A PYROTECHNICAL COUNTERMEASURE

CROSS REFERENCE TO RELATED APPLICATIONS

This application is a National Stage Application, filed under 35 U.S.C. § 371, of International Application No. PCT/SE2022/050146, filed Feb. 11, 2022, which international application claims priority to and the benefit of Swedish Application No. 2100024-5, filed Feb. 16, 2021; the contents of both of which as are hereby incorporated by reference in their entireties.

BACKGROUND

Related Field

The disclosure relates to a pyrotechnical countermeasure dispenser system and a method for dispensing detection of a pyrotechnical countermeasure in a pyrotechnical countermeasure dispenser system. The pyrotechnical countermeasure dispenser system comprises a pyrotechnical countermeasure dispenser, at least one pyrotechnical countermeasure cartridge arranged to be fitted in the pyrotechnical countermeasure dispenser, and a pyrotechnical countermeasure dispenser control unit configured for controlling the dispensing of the pyrotechnical countermeasure from the pyrotechnical countermeasure cartridge.

Description of Related Art

Pyrotechnical countermeasure dispensing systems for deploying countermeasures such as chaff and flares in response to threats directed towards a mobile platform equipped with such a pyrotechnical countermeasure dispensing systems. Examples of such systems can for instance be found in US 2015/0331417 A1 or U.S. Pat. No. 4,313, 379.

The pyrotechnical countermeasure is dispensed from a pyrotechnical countermeasure cartridge arranged in the pyrotechnical countermeasure dispenser by means of a squib charge that is set off by means of a dispensing command initiated by a pilot of the mobile platform or by an automatic command upon detection and assessment of an incoming threat. For each pyrotechnical countermeasure cartridge, a bridgewire is connected to a squib. Upon initiation of a dispensing command, current is run through the bridgewire that heats the bridgewire to a high temperature. This starts an exothermic chemical reaction of an attached pyrotechnic composition that in turn sets of the squib, dispensing the contents of the pyrotechnical countermeasure cartridge, e.g. chaff or flare.

One problem that can arise in a pyrotechnical countermeasure dispenser is a misfire of a pyrotechnical countermeasure cartridge meaning that dispensing does not occur, even though a dispensing command has been issued. Today, a dispensing current is measured through the bridgewire and dispensing is deemed successful is a dispensing current has been properly detected. This is however not always the case as the squib may not detonate even though the bridgewire has ignited in a desired way. A misfire causes a number of problems, such as a pilot incorrectly believing that pyrotechnical countermeasure has been dispensed.

There is thus a need for an improved detection of misfire in pyrotechnical countermeasure dispenser systems.

BRIEF SUMMARY

An objective of this disclosure is to provide a method for dispensing detection of a pyrotechnical countermeasure in a pyrotechnical countermeasure dispenser system and a pyrotechnical countermeasure dispenser system that addresses the problems described above. This object is achieved by the technical features contained in the characterizing portion of independent claims 1 and 5. The dependent claims contain advantageous embodiments, further developments and variants of the method and system.

The disclosure relates to a method for dispensing detection of a pyrotechnical countermeasure in a pyrotechnical countermeasure dispenser system. The pyrotechnical countermeasure dispenser system comprises a pyrotechnical countermeasure dispenser, at least one pyrotechnical countermeasure cartridge arranged to be fitted in the pyrotechnical countermeasure dispenser, and a pyrotechnical countermeasure dispenser control unit configured for controlling the dispensing of the pyrotechnical countermeasure from the pyrotechnical countermeasure cartridge. The method comprises:

providing the pyrotechnical countermeasure dispenser control unit with a recoil-sensing device, wherein upon activation of a pyrotechnical countermeasure dispensing command, monitoring the sensing of a recoil signal from the recoil-sensing device during a monitoring window, determining that a dispensing of the pyrotechnical countermeasure from the pyrotechnical countermeasure cartridge has occurred upon detection of the recoil signal exceeding a recoil detection threshold value during the monitoring window, determining that a misfire of the pyrotechnical countermeasure has occurred upon no detection of the recoil signal during the monitoring window.

By adding a recoil-sensing device to the electronic circuitry of the pyrotechnical countermeasure dispenser, i.e. to a pyrotechnical countermeasure dispenser control unit, it is possible to monitor the presence or absence of a recoil signal generated by the recoil-sensing device during a period of time, i.e. a monitoring window, after a pyrotechnical countermeasure dispensing command is generated to dispense the pyrotechnical countermeasure. This allows for an improved detection of if a pyrotechnical countermeasure has been dispensed or not compared to today's methods.

When a pyrotechnical countermeasure dispensing command is generated, a dispensing current through a bridgewire connected to a squib charge in the pyrotechnical countermeasure cartridge is measured. Previously, the detection of a dispensing current was deemed enough to indicate a successful dispensing of the pyrotechnical countermeasure. However, as described above, this is not always the case. By supplementing the dispensing current detection with the detection of a recoil signal from a recoil-sensing device in the pyrotechnical countermeasure dispenser control unit, a more certain detection of fire or misfire of the pyrotechnical countermeasure can be made. If the recoil signal exceeds a recoil detection threshold value during the monitoring window, a successful dispensing is assumed. If there is no detection of the recoil signal during the monitoring window period, even if the dispensing current was detected as expected, a misfire is declared.

Further advantages are that in the case of an anomaly in the detection of the dispensing current with a subsequent detection of a recoil signal by the recoil-sensing device can initiate a misfire compensation (if so wished or required) much earlier than is possible with the current implementation.

The pyrotechnical countermeasure dispenser system may be arranged in a platform, wherein the method comprises:

measuring a noise signal value of a background noise signal from the platform, adjusting the recoil detection threshold value to a predetermined value above the noise signal value of the background noise signal from the platform.

If the pyrotechnical countermeasure dispenser system is arranged in a platform, background noise signals in the recoil-sensing device will be present, for instance from vibrations from the platform. A recoil signal level of the recoil signal detected by the recoil-sensing device in the monitoring window is normally greater than a noise signal level generated by platform vibrations. In order to always make sure that the background noise signal does not cause any recoil signal detection issues, the noise signal value of the background noise signal from the platform is continuously or intermittently measured and the recoil detection threshold value is adjusted to a predetermined value above the noise signal value of the background noise signal from the platform. In this way, should the noise signal value approach the recoil detection threshold value, the recoil detection threshold value is adjusted such that the background noise signal value itself cannot be mistaken for a recoil signal.

The method may comprise:

preventing a subsequent dispensing of a further pyrotechnical countermeasure from the pyrotechnical countermeasure dispenser until a recoil signal exceeding a recoil detection threshold value is detected.

The dispensing detection can also serve as a safety enhancing mechanism to inhibit simultaneous dispensing within the sensing window period, up to the point the impulse is detected before allowing subsequent dispensing to be allowed.

The method may comprise:

measuring vibrations continuously with the recoil-sensing device to monitor the health status of the pyrotechnical countermeasure dispenser and other platform systems.

Monitoring the health status of both the pyrotechnical countermeasure dispenser and a mounting interface to the platform can be performed by continuously monitoring the vibration levels during flight and usage. When abnormal vibration frequencies start to become evident, this can be used as an early indicator to service or replace parts even on platform level. This can hugely benefit platforms that does not have a vibration monitoring Health and Usage Monitoring System (HUMS). On-condition servicing will greatly improve the availability of the equipment.

The disclosure further relates to a pyrotechnical countermeasure dispenser system comprising a pyrotechnical countermeasure dispenser, at least one pyrotechnical countermeasure cartridge arranged to be fitted in the pyrotechnical countermeasure dispenser, and a pyrotechnical countermeasure dispenser control unit configured for controlling the dispensing of the pyrotechnical countermeasure from the pyrotechnical countermeasure cartridge. The dispenser control unit further comprises a recoil-sensing device. The dispenser control unit upon activation of a pyrotechnical countermeasure dispensing command is configured for monitoring the sensing of a recoil signal from the recoil-sensing device during a monitoring window, determining that dispensing of the pyrotechnical countermeasure has occurred upon detection of the recoil signal exceeding a recoil detection threshold value during the monitoring window, and determining that a misfire of the pyrotechnical countermeasure has occurred if no detection of the recoil signal is made during the monitoring window.

The advantages for the system are the same as described for the method above.

The recoil-sensing device may be a load cell or a three-axis accelerometer.

These alternatives are inexpensive and easy to implement in the pyrotechnical countermeasure dispenser control unit.

The dispenser control unit may comprise two or more recoil-sensing devices.

In order to obtain redundancy or to increase accuracy in detection, more than one recoil-sensing device may be used. In case more than one recoil-sensing device is used, they do not have be of the same type. I.e., one recoil-sensing device can be a load cell and one recoil-sensing device can be a three-axis accelerometer.

The pyrotechnical countermeasure dispenser system may be arranged in a platform, wherein the dispenser control unit may be configured for:

measuring a noise signal value of a background noise signal from the platform, adjusting the recoil detection threshold value to a predetermined value above the noise signal value of the background noise signal from the platform.

The advantages for the system are the same as described for the method above.

The dispenser control unit may be configured for preventing a subsequent dispensing of a further pyrotechnical countermeasure from the pyrotechnical countermeasure dispenser until a recoil signal exceeding a recoil detection threshold value is detected.

The advantages for the system are the same as described for the method above.

The dispenser control unit may be configured for measuring vibrations continuously with the recoil-sensing device to monitor the health status of the pyrotechnical countermeasure dispenser and other platform systems.

The advantages for the system are the same as described for the method above.

The disclosure further comprises a platform comprising a pyrotechnical countermeasure dispenser system according to the above description.

The platform may be an aircraft such as an airplane or a helicopter.

DETAILED DESCRIPTION OF VARIOUS EMBODIMENTS

As used herein, a platform is generally intended to refer to a mobile platform such as an aircraft. Examples of aircraft are airplanes or helicopters. Mobile platforms may also refer to land or sea based mobile platforms such as land vehicles and watercraft such as ships and boats. The mobile platform may be manned or unmanned.

The pyrotechnical countermeasure dispenser system is arranged to prevent damage from threats directed towards the mobile platform. These threats include tube-dispensed, optically tracked, wire-guided missiles (TOWs), rocket propelled grenades (RPGs), shoulder-dispensed surface-to-air missiles (SAMs), man-portable air-defence systems (MANPADS or MPADS) and similar aerial weapons.

Figure 1:
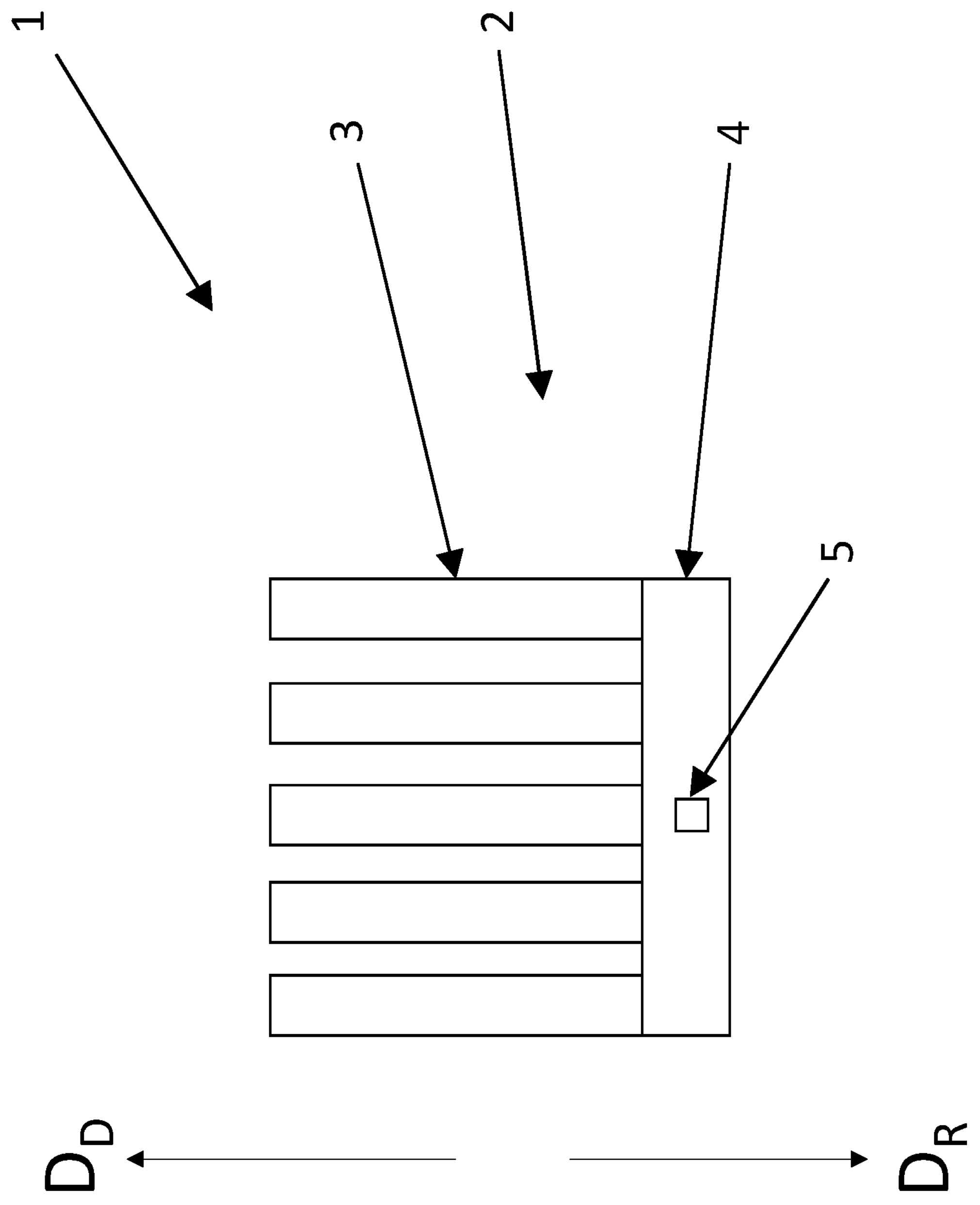
FIG. 1 schematically shows a pyrotechnical countermeasure dispenser system according to the disclosure, FIGS. 2*a*-2*c* schematically show a sequence of recoil detection from firing a pyrotechnical countermeasure where a recoil signal is detected, FIGS. 3*a*-3*c* schematically show a sequence of recoil detection from firing a pyrotechnical countermeasure where a recoil signal is not detected.

FIG. 1 schematically shows a pyrotechnical countermeasure dispenser system 1 according to the disclosure. The pyrotechnical countermeasure dispenser system 1 comprises a pyrotechnical countermeasure dispenser 2, at least one pyrotechnical countermeasure cartridge 3 arranged to be fitted in the pyrotechnical countermeasure dispenser 2, and a pyrotechnical countermeasure dispenser control unit 4 configured for controlling the dispensing of the pyrotechnical countermeasure from the pyrotechnical countermeasure cartridge 3. In the example shown in FIG. 1, the pyrotechnical countermeasure dispenser 2 comprises five different pyrotechnical countermeasure cartridges 3, each arranged to be fitted with chaff or flare expendables. The pyrotechnical countermeasure dispenser 2 with the pyrotechnical countermeasure cartridges 3 is mounted on the pyrotechnical countermeasure dispenser control unit 4 as is known in the art today.

The pyrotechnical countermeasure cartridges 3 are operated in the same way as is known today by means of igniting a squib charge connected to a bridgewire. When dispensing of a pyrotechnical countermeasure cartridge 3 is initiated, the current through the bridgewire is measured to detect if dispensing of the pyrotechnical countermeasure cartridge 3 has taken place. The method and system of the disclosure are intended to complement this known technology to improve detection accuracy and reliability. The workings of pyrotechnical countermeasure cartridges 3 will not be described in more detail.

The pyrotechnical countermeasure dispenser control unit 4 is a printed circuit board (PCB) comprising all the necessary circuitry required to operate the pyrotechnical countermeasure dispenser 2 and to communicate with a platform control unit of a platform onto which it is installed. On the pyrotechnical countermeasure dispenser control unit 4, a recoil-sensing device is installed in order to detect the dispensing of pyrotechnic countermeasures. Necessary adaptations are made to the pyrotechnical countermeasure dispenser control unit 4 such that the recoil-sensing device can send and/or receive information to/from the platform control unit. Such adaptations include providing a fitting for the recoil-sensing device and etching conductive traces to control interfaces on the pyrotechnical countermeasure dispenser control unit 4. These adaptations are well known in the art and will not be described in detail here.

As is shown in FIG. 1, the pyrotechnical countermeasure cartridges 3 are arranged such that they dispense their content in a dispensing direction DD. When a pyrotechnical countermeasure is dispensed, a recoil force acting in a recoil direction DR, essentially in the opposite direction of the dispensing direction DD, is exerted on the platform and thereby on the pyrotechnical countermeasure dispenser control unit 4. As the recoil-sensing device is arranged on the pyrotechnical countermeasure dispenser control unit 4, a recoil signal can be detected by the recoil-sensing device when the pyrotechnical countermeasure is dispensed successfully.

Figures 2A, 2B, 2C:
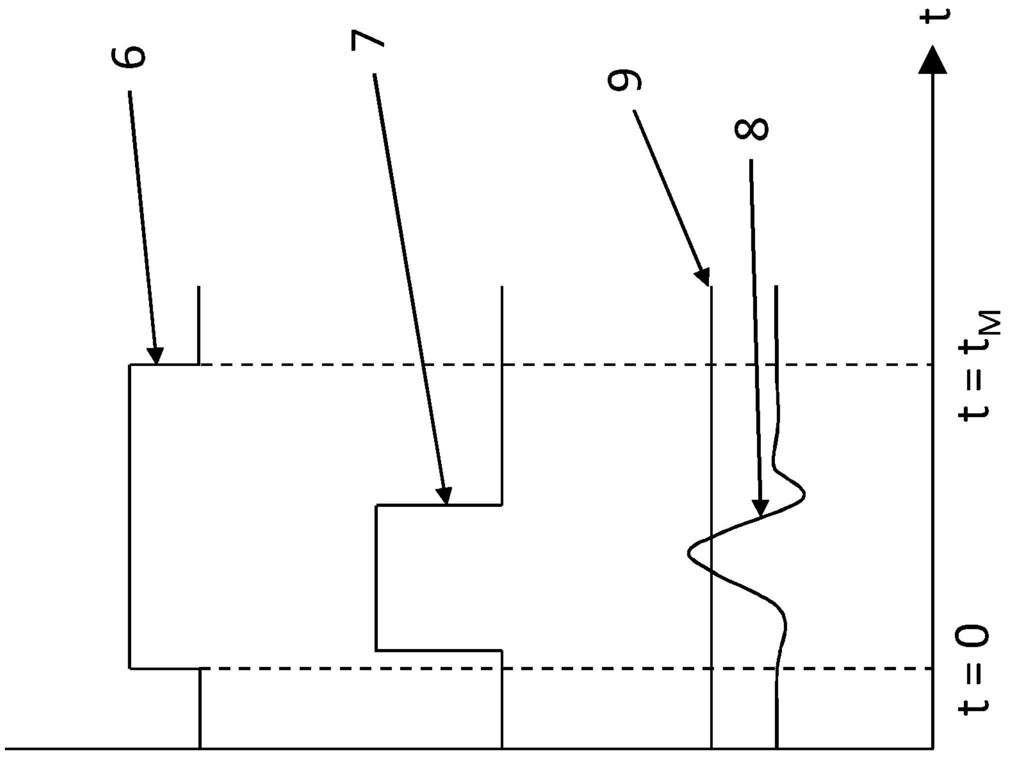

FIGS. 2*a*-2*c* schematically show a sequence of recoil detection from firing a pyrotechnical countermeasure where a recoil signal is detected. In FIGS. 2*a*-2*c*, a monitoring window 6, a firing pulse 7 and a recoil signal 8 are shown in the same chart, with time t on the x-axis.

FIG. 2*a* schematically show a monitoring window 6. The length $t_M$ of the monitoring window 6 is approximately between 100 and 300 milliseconds, specifically between 150 and 250 milliseconds, more specifically approximately 200 milliseconds. The monitoring starts upon activation of a pyrotechnical countermeasure dispensing command.

FIG. 2*b* schematically shows a firing pulse 7 originating from the activation of a pyrotechnical countermeasure dispensing command and occurs at a slight delay from the start of the monitoring. The firing pulse 7 activates the squib charge through the bridgewire.

FIG. 2*c* schematically shows a recoil signal 8 as measured by the recoil-sensing device. As is schematically shown, a recoil detection threshold value 9 is set above a noise signal value (not shown) in order to prevent misdetections due to vibrations from the platform. As mentioned above, the recoil detection threshold value 9 can be dynamically adjusted to adapt for differences in vibrations of the platform over time. The recoil signal 8 exceeds the recoil detection threshold value 9 during the monitoring window 6 indicating that the pyrotechnical countermeasure has been dispensed properly.

The dashed lines schematically show the start at t=0 and the end at $t=t_M$ of the monitoring window 6 in relation to both the firing pulse 7 and the recoil signal 8. As is shown, a recoil signal 8 is detected within the monitoring window 6. As is already known, the current through the bridgewire is measured and the combination of the measurement of current through the bridgewire and the measurement of a recoil signal 8 exceeding the recoil detection threshold value 9 is used to detect a successful dispensing of pyrotechnical countermeasure.

Figures 3A, 3B, 3C:
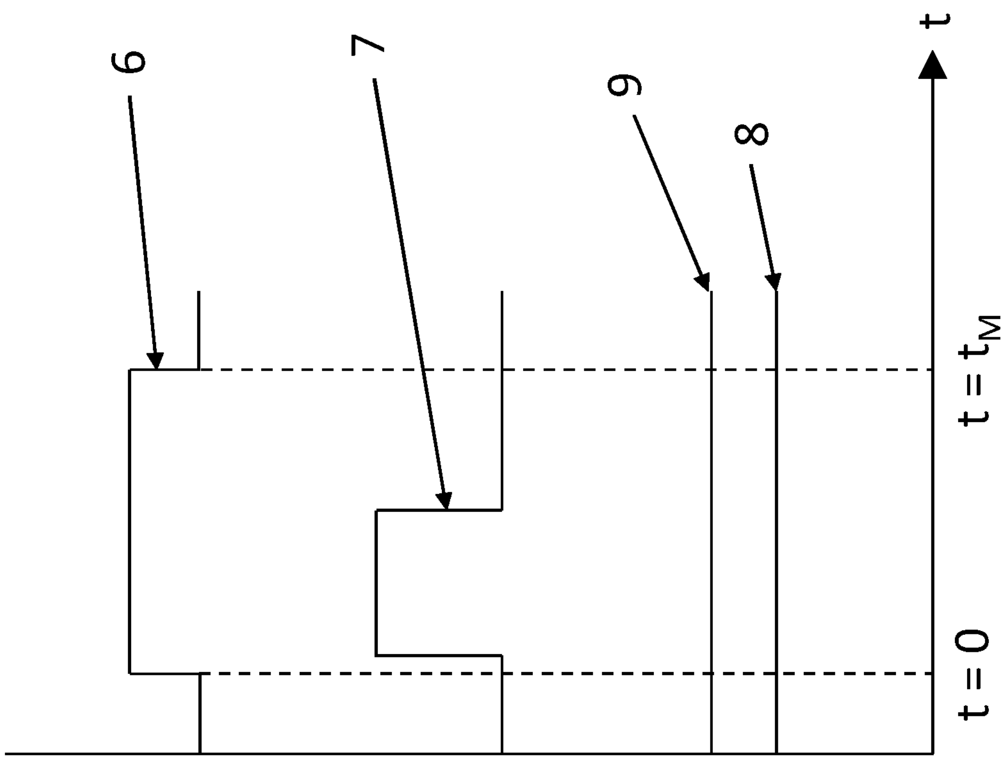

FIGS. 3*a*-3*c* schematically show a sequence of recoil detection from firing a pyrotechnical countermeasure where a recoil signal is not detected. In FIGS. 3*a*-3*c*, a monitoring window 6, a firing pulse 7 and a recoil signal 8 are shown in the same chart, with time t on the x-axis in the same way as in FIGS. 2*a*-2*c*.

FIG. 3*a* schematically show a monitoring window 6. The length $t_M$ of the monitoring window 6 is approximately between 100 and 300 milliseconds, specifically between 150 and 250 milliseconds, more specifically approximately 200 milliseconds. The monitoring starts upon activation of a pyrotechnical countermeasure dispensing command.

FIG. 3*b* schematically shows a firing pulse 7 originating from the activation of a pyrotechnical countermeasure dispensing command and occurs at a slight delay from the start of the monitoring. The firing pulse 7 activates the squib charge through the bridgewire.

FIG. 3*c* schematically shows a recoil signal 8 as measured by the recoil-sensing device. As is schematically shown, a recoil detection threshold value 9 is set above a noise signal value (not shown) in order to prevent misdetections due to vibrations from the platform. As mentioned above, the recoil detection threshold value 9 can be dynamically adjusted to adapt for differences in vibrations of the platform over time.

The dashed lines schematically show the start at t=0 and the end at $t=t_M$ of the monitoring window 6 in relation to both the firing pulse 7 and the recoil signal 8. As is shown, a recoil signal 8 is not detected within the monitoring window 6. For simplicity, the recoil signal is made flat. This can for instance be made by using filters to remove the noise that would otherwise cause the signal to vary over time. In this case, a dispensing current through the bridgewire is measured and the lack of a measurement of a recoil signal 8 exceeding the recoil detection threshold value 9 is used to detect a misfire of pyrotechnical countermeasure.

As will be realised, the invention is capable of modification in various obvious respects, all without departing from the scope of the appended claims. Accordingly, the drawings and the description are to be regarded as illustrative in nature, and not restrictive.

The invention claimed is:

1. A method for dispensing detection of a pyrotechnical countermeasure in a pyrotechnical countermeasure dispenser system (1), wherein the pyrotechnical countermeasure dispenser system (1) comprises a pyrotechnical countermeasure dispenser (2), at least one pyrotechnical countermeasure cartridge (3) arranged to be fitted in the pyrotechnical countermeasure dispenser (2), and a pyrotechnical countermeasure dispenser control unit (4) configured for controlling the dispensing of the pyrotechnical countermeasure from the at least one pyrotechnical countermeasure cartridge (3), wherein the method comprises:

- providing the pyrotechnical countermeasure dispenser control unit (4) with a recoil-sensing device (5), and
- upon activation of a pyrotechnical countermeasure dispensing command:
  - monitoring the sensing of a recoil signal (8) from the recoil-sensing device (5) during a monitoring window (6), and
  - preventing a subsequent pyrotechnical countermeasure from the pyrotechnical countermeasure dispenser based on the recoil signal and a recoil detection threshold value.

2. The method according to claim 1, wherein the pyrotechnical countermeasure dispenser system (1) is arranged in a platform and the method further comprises:

- measuring a noise signal value of a background noise signal from the platform, and
- adjusting the recoil detection threshold value (9) to a predetermined value above the noise signal value of the background noise signal from the platform.

3. The method according to claim 2, wherein the method further comprises preventing a subsequent dispensing of a further pyrotechnical countermeasure from the pyrotechnical countermeasure dispenser (2) until the recoil signal (8) exceeding the recoil detection threshold value (9) is detected.

4. The method according to claim 1, wherein the method further comprises measuring vibrations continuously with the recoil-sensing device (5) to monitor a health status of the pyrotechnical countermeasure dispenser (2) and other platform systems.

5. A pyrotechnical countermeasure dispenser system (1) comprising:

- a pyrotechnical countermeasure dispenser (2),
- at least one pyrotechnical countermeasure cartridge (3) arranged to be fitted in the pyrotechnical countermeasure dispenser (2), and
- a pyrotechnical countermeasure dispenser control unit (4) configured for controlling the dispensing of the pyrotechnical countermeasure from the at least one pyrotechnical countermeasure cartridge (3), wherein:

- the pyrotechnical countermeasure dispenser control unit (4) further comprises a recoil-sensing device (5),
- the pyrotechnical countermeasure dispenser control unit (4) activation of a pyrotechnical countermeasure dispensing command is configured for monitoring the sensing of a recoil signal (8) from the recoil-sensing device (5) during a monitoring window (6), and preventing a subsequent pyrotechnical countermeasure from the pyrotechnical countermeasure dispenser based on the recoil signal and a recoil detection threshold value.

6. The pyrotechnical countermeasure dispenser system (1) according to claim 5, wherein the recoil-sensing device (5) is a load cell or a three-axis accelerometer.

7. The pyrotechnical countermeasure dispenser system (1) according to claim 6, wherein the pyrotechnical countermeasure dispenser control unit (4) comprises two or more recoil-sensing devices (5).

8. The pyrotechnical countermeasure dispenser system (1) according to claim 5, wherein the pyrotechnical countermeasure dispenser control unit (4) comprises two or more recoil-sensing devices (5).

9. The pyrotechnical countermeasure dispenser system (1) according to claim 5, wherein the pyrotechnical countermeasure dispenser system (1) is arranged in a platform and the pyrotechnical countermeasure dispenser control unit (4) is configured for:

- measuring a noise signal value of a background noise signal from the platform, and
- adjusting the recoil detection threshold value (9) to a predetermined value above the noise signal value of the background noise signal from the platform.

10. The pyrotechnical countermeasure dispenser system (1) according to claim 5, wherein the pyrotechnical countermeasure dispenser control unit (4) is configured for preventing a subsequent dispensing of a further pyrotechnical countermeasure from the pyrotechnical countermeasure dispenser (2) until the recoil signal (8) exceeding the recoil detection threshold value (9) is detected.

11. The pyrotechnical countermeasure dispenser system (1) according to claim 5, wherein the pyrotechnical countermeasure dispenser control unit (4) is configured for measuring vibrations continuously with the recoil-sensing device (5) to monitor a health status of the pyrotechnical countermeasure dispenser (2) and other platform systems.

12. A platform comprising the pyrotechnical countermeasure dispenser system (1) according to claim 5.

13. The platform according to claim 12, wherein the platform is an aircraft.

14. The platform according to claim 13, wherein the aircraft is an airplane or a helicopter.

* * * * *